United States Patent [19]

Rayburn

[11] 4,146,914
[45] Mar. 27, 1979

[54] PLEATED METALLIZED FILM CAPACITOR WITH STAGGERED EDGES

[75] Inventor: Charles C. Rayburn, Mt. Prospect, Ill.

[73] Assignee: Illinois Tool Works Inc., Chicago, Ill.

[21] Appl. No.: 814,955

[22] Filed: Jul. 12, 1977

[51] Int. Cl.² ............................................. H01G 1/015
[52] U.S. Cl. .................................... 361/304; 361/301; 361/308
[58] Field of Search ............... 361/301, 303, 304, 308, 361/309, 311

[56] References Cited

U.S. PATENT DOCUMENTS

| | | | |
|---|---|---|---|
| 2,470,826 | 5/1949 | McMahon | 361/301 |
| 2,919,390 | 12/1959 | Robinson | 361/301 X |

FOREIGN PATENT DOCUMENTS 754574  1/1953  Fed. Rep. of Germany ........... 361/309

Primary Examiner—E. A. Goldberg
Attorney, Agent, or Firm—Glenn W. Bowen; Robert W. Beart

[57] ABSTRACT

An electrical capacitor is formed utilizing a thin dielectric layer which is metallized on both sides to provide electrode areas. The capacitor is formed by pleating, or folding, the dielectric layer along its longitudinal dimension an odd number of times. The pleats are not creased but are allowed to form smoothly curved edges in which the radius of such bend is at least equal to the thickness of the film. In addition the edges of the pleats are progressively staggered so that the centers of the bend of one pleat edge is removed a distance of at least four film thicknesses from its neighboring centers. This configuration prevents the end of the capacitor from forming a "bar-bell" shape and in addition minimizes mechanical damage to the film and alteration of the electric field.

10 Claims, 8 Drawing Figures

U.S. Patent  Mar. 27, 1979  4,146,914
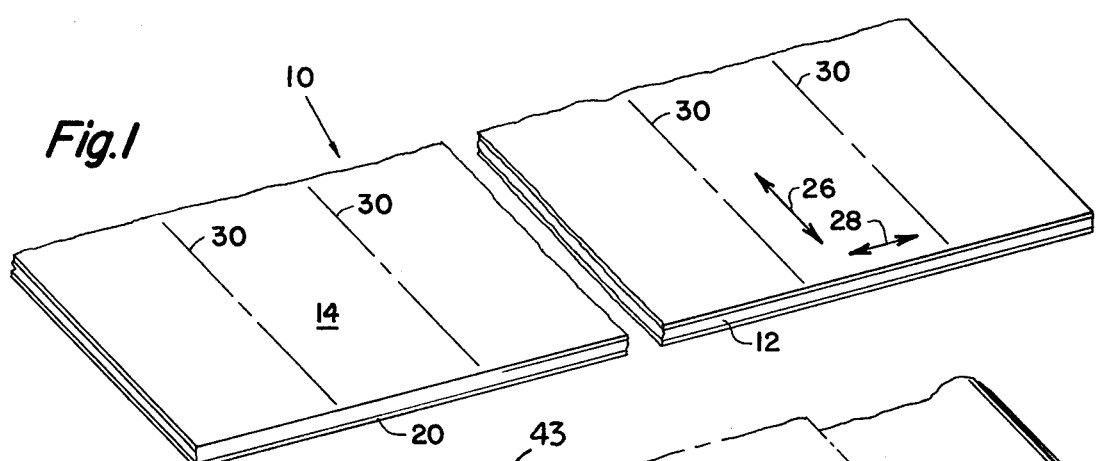
Fig.1
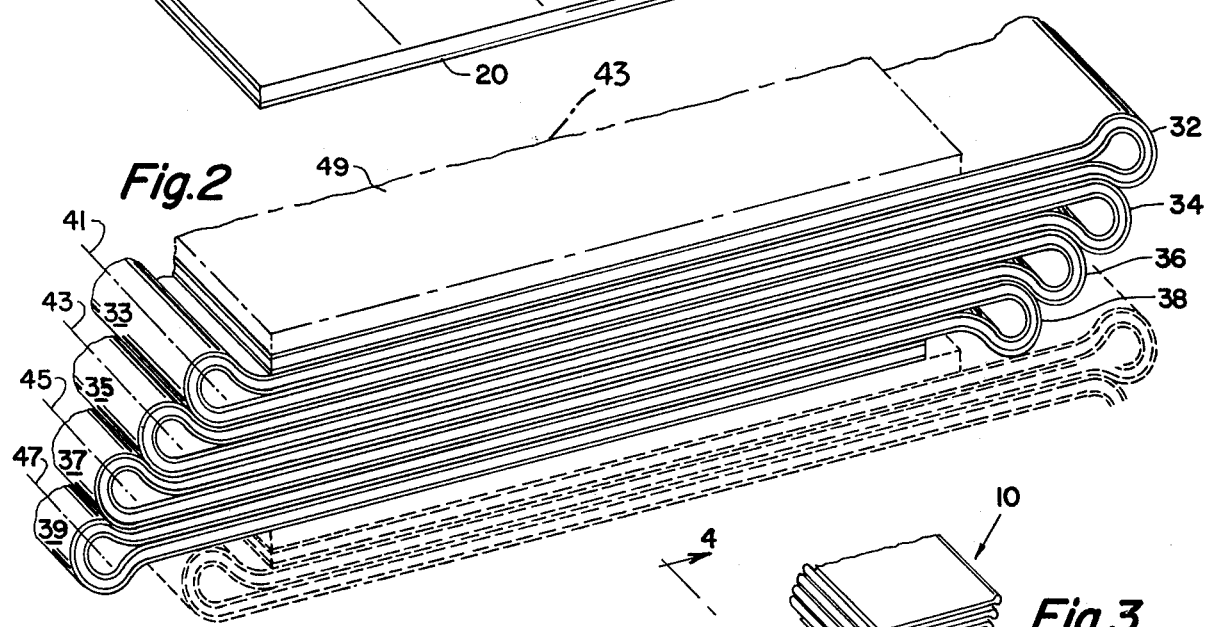
Fig.2
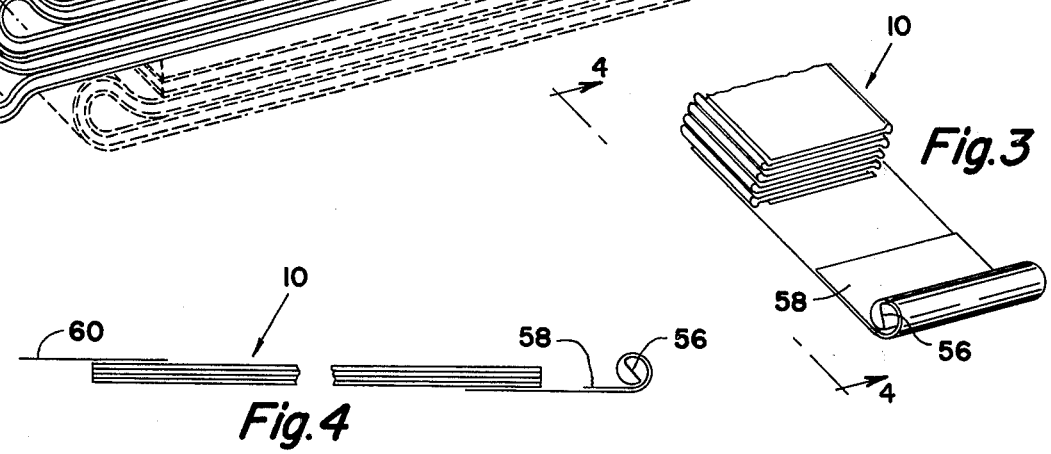
Fig.3
Fig.4
Fig.5
Fig.6
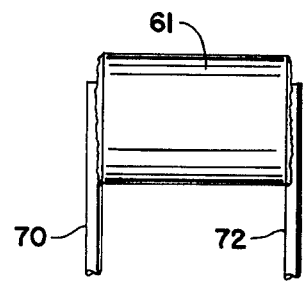
Fig.7

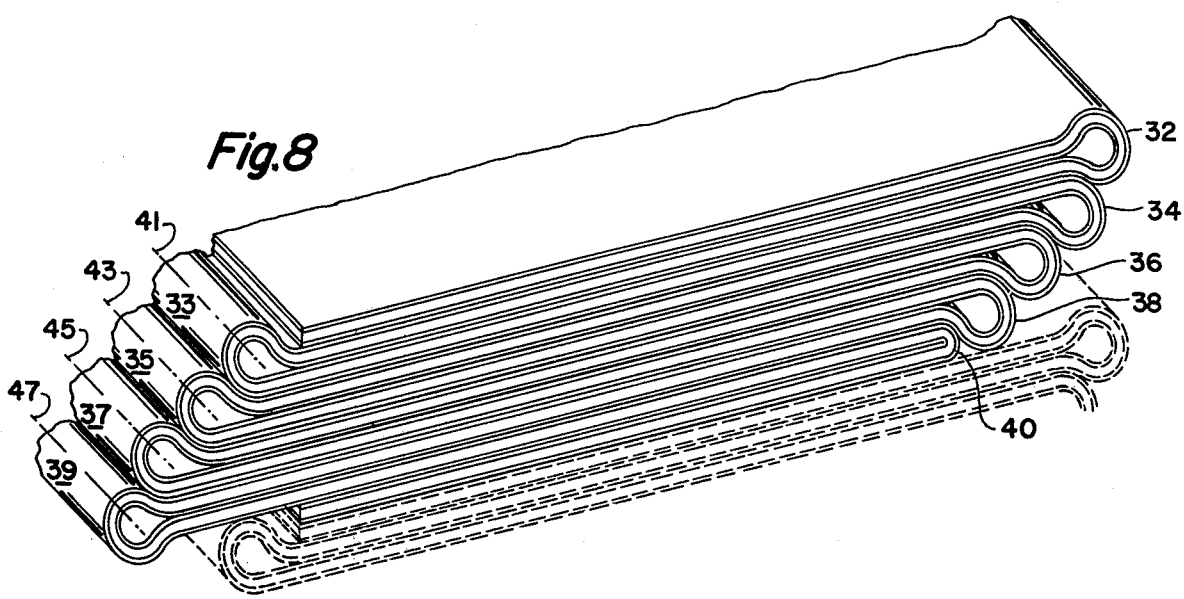

PLEATED METALLIZED FILM CAPACITOR WITH STAGGERED EDGES

BACKGROUND OF THE INVENTION

Electrical capacitors made of thin film dielectric material which is metallized on both sides are used in large quantities in electrical devices because of their reliability, their desirable electrical characteristics and their relatively low cost. U.S. Pat. No. 2,470,826 issued on May 24, 1949 to W. McMahon illustrates a capacitor in which a double sided metallized dielectric layer is folded an odd number of times in a longitudinal direction. The folded dielectric material may then be wound along its longitudinal dimension and end terminations may then be applied to it by spraying of metal against the edges of the wound capacitor segment. The type of capacitor described by McMahon patent is extremely desirable because substantially all of the dielectric layer of the capacitor is in the electric field and the capacitor may be made without the insertion of an additional dielectric layer in the main body of the capacitor, although a short initial unmetallized dielectric strip and a protective terminating dielectric strip may be employed with the capacitor, if desired.

The type of capacitor construction that is envisioned by McMahon patent has a number of decided manufacturing and electrical advantages. For example, the problem of masking the dielectric layer during electrode evaporation when the electrode areas are applied to the film is substantially reduced. In addition, no slitting is required as it is during the manufacture of conventional wound film capacitors. Furthermore, the capacitance per unit dielectric area is maximized because of the substantially full use of the dielectric layer in the electric field, and, thus, shorter winding lengths per unit capacitance are required, thereby reducing the winding labor. Additionally, the capacitance lengths can be calibrated and pre-cut to produce a capacitor of more accurate values. Another advantage of this type of capacitor is that there are no air layers between the metallized electrodes and the pleated film surfaces and this increases the voltage at which corona discharge starts.

The McMahon patent suggested that leads could be attached to his pleated and wound capacitor by the well-known Schoop process. Actually, however, the application of high velocity metallic spray coatings to the edges of the capacitor described by McMahon is not commercially practical because metallic spray will penetrate through the dielectric area at a pleat and thereby short one electrode to the other. If the temperature and pressure of the spray are lowered, penetration of the dielectric layers may be reduced but the adhesion of the metallic spray will generally be very poor. The type of multiple leads that were suggested in the McMahon patent that were wound into his capacitor also is not satisfactory since these leads tend to tear the dielectric material and they make the capacitor bulky and inductive.

In order to solve the above mentioned spray shorting problem at a pleated edge, it has been suggested in Australian Pat. No. 159,958, patented on Nov. 24, 1954 to provide unmetallized dielectric strips behind all of the pleats of a pleated metallized capacitor. While this solution may provide a technically feasible method of attaching leads to a pleated metallized dielectric layer capacitor, the number of unmetallized strips that are required on the dielectric layer greatly complicates the manufacturing process for both the dielectric layer itself and the pleated capacitor product. For example, in a capacitor having five pleats, there must be, in addition to the two unmetallized margin areas, five unmetallized strips that run along the entire length of the dielectric material, with three of these strips being on one side of the dielectric layer and two of these strips being on the opposite side of the dielectric layer. It is apparent that the masking problems and the cost of manufacturing such a specialized item make the solution of the Australian patent commercially unattractive. However, it is feasible to manufacture capacitors with unmetallized strips behind each pleat; and moreover leads may be secured to pleated double-sided metallized capacitors by other known methods, for example, by use of conductive epoxy.

The configuration of the capacitor of the present invention provides a product which has all of the advantages of pleated, or pleated and wound, capacitors and also has the added advantages that the distortion of the electric field in the electrode areas is minimized, mechanical stress and the resulting damage is reduced and the capacitor does not assume a "bar-bell" shape with rings of a larger diameter than the rest of the capacitors forming near the ends of the capacitor. In addition to the use of the present invention to manufacture wound film capacitors, it is also possible to utilize the invention to produce ceramic capacitors in which the capacitor dielectric material is folded while the ceramic material is still in a "green" state, in a manner similar to that disclosed in U.S. Pat. No. 3,223,494 issued Dec. 14, 1965 to J. E. Crownover.

DESCRIPTION OF THE DRAWINGS

The present invention is illustrated by reference to the drawings in which:

FIG. 1 is a perspective view of a portion of a metallized dielectric layer which may be used in the construction of the capacitor of the present invention;

FIG. 2 is a perspective view of a pleated metallized dielectric layer in accordance with the present invention having eight pleat lines in which an unmetallized dielectric insert is included;

FIG. 3 is a perspective view of the fully pleated dielectric layer of FIG. 2 which, in addition, shows a winding mandrel and an unmetallized dielectric insert;

FIG. 4 is a diagrammatic showing of the winding of a capacitor segment in accordance with the construction of FIG. 2;

FIG. 5 is an end view of a capacitor segment, before lead attachment, that is wound in accordance with the showing of FIGS. 3 and 4;

FIG. 6 is an end view of the wound capacitor segment of FIG. 5 after it has been pressed into an oval shape;

FIG. 7 is a side view of a completed capacitor following the attachment of radial leads; and FIG. 8 is a perspective view of an alternate embodiment of the present invention.

TECHNICAL DESCRIPTION OF THE INVENTION

A portion of a commercially available metallized dielectric strip which may be unwound from a reel, that is suitable for a making of a capacitor in accordance with the present invention is shown in FIG. 1. The metallized dielectric strip is formed with a dielectric layer 12 of a thin film dielectric material, such as polyester, polypropylene, polystyrene, polycarbonate or other suitable material. A thin metallized electrode layer 14 is applied to the upper surface of the dielectric layer 12. Unmetallized margin areas may extend along the longitudinal edges of the strip 10 if desired. A thin metallized electrode area is applied to the lower surface of the dielectric layer 12. The electrode areas 14, 20 may contain unmetallized strips where the pleats are to be made if a metallized end spray termination is to be employed.

The embodiment shown in FIG. 1, the longitudinal dimension of the metallized strip 10 is shown along the arrows 26 while the narrow transverse dimension is shown along the narrow 28. The capacitor to be pleated is along the longitudinal imaginary lines 30. The capacitor of the present invention, however, is not limited to one in which folding is along longitudinal lines since a capacitor could be made in accordance with the present invention by pleating along transverse lines if the appropriate corresponding metallized and unmetallized areas were provided.

A pleated capacitor is shown in FIG. 2 wherein it is to be noted that edges of the pleats 32, 34, 36 and 38 and 33, 35, 37, 39 are formed with a smooth generally circular bend which has a radius that is at least equal to the thickness of the dielectric layer 12. The center lines 41, 43, 45 and 47 through the centers of the bends 33, 35, 37, 39 are spaced so that they are displaced a distance of at least four times the thickness of the dielectric layer 12 from each other. The extension of the same radius and displacement requirements apply to the pleats 32, 34, 36 and 38 on the other side of the capacitor. The edges 32-38 and 33-39 are staggered for two reasons:

(1) To prevent mechanical "dumb-belling" of the wound section which occurs if the edges are held in alignment;

(2) To minimize flat folds which constitute electrical weak points. The film is mechanically altered when it is stressed to bend over a zero overall radius. Further, the electric field intensity is increased in the dielectric near the fold line as the bending radius approaches zero radius. The mechanical damage and electric field alteration contribute to making this fold line an electrically weakened area which will be first to clear by arcing away adjacent electrodes as the capacitor charging potential is increased. Excessive "clearing" will result in reduced insulation resistance, increased dissipation factor and reduced capacitance value.

In the embodiment of FIG. 2, unmetallized dielectric layers 49 and 49' are employed to prevent the lowermost edges, such as the edge 38, from being deformed from its normal generally circular bend. In the alternate embodiment of FIG. 8, these dielectric layers are removed which results in the lower bend 40 being creased from its normal circular bend. The configuration of FIG. 2, therefore, is preferred over that of FIG. 8 where the increased cost of construction is acceptable for the desired application. The dotted lines of FIGS. 2 and 8 represent the second group of pleated layers of the capacitor while the solid lines represent the first group.

After the capacitor has been processed to form the capacitor segment shown in FIG. 2, a number of different additional processing steps may be undertaken. For example, if the pleated capacitor segment of FIG. 2 had unmetallized strips on the inside of each pleat this segment could be used to form a capacitor merely by spraying the right and left hand longitudinal edges of the segment with a metallized spray, such as babbitt or other suitable metal, in accordance with conventional practice, and then electrical leads could be secured to them, for example, by soldering. Alternately, leads could be attached to the capacitor segment of FIG. 2 by use of conductive epoxy or other suitable known methods. In conjunction with the present preferred embodiment of the present invention, however, FIG. 2 represents two layers of a capacitor segment formed by winding of the dielectric strip about the longitudinal dimension of the strip 10, as shown in FIGS. 3 and 4, to form a wound capacitor. Another version of this capacitor could be achieved, however, by pleating the capacitor segment of FIG. 3 a number of times transversely along transverse fold lines such as the line 43, or alternately, pleating several times, and then completing the segment by winding the remainder of the length of the dielectric strip.

The winding of the capacitor segment of FIG. 2 into a wound capacitor may be achieved with various winding techniques, including the use of a split mandrel such as the mandrel 56 of FIGS. 3 and 4, which may be removed from the capacitor segment after it has been wound. An unmetallized dielectric strip 58 is desirably initially wound around the mandrel to protect the metallized electrode areas of the metallized strip 10. The winding of the capacitor segment then continues until it is almost completed, at which time an additional unmetallized dielectric strip 60 is then desirably wound into the structure to form an outer protective coating. The dielectric strip 60 may also be heat-sealed to itself to form the pleated capacitor segment 61 which is shown in FIG. 5. The removal of the mandrel 56 from the capacitor segment 61 leaves an opening 62 in the unit. The opening 62 may be closed by applying pressure, or pressure and heat, in accordance with the type of dielectric layer used and conventional capacitor manufacturing techniques, to the capacitor segment 61 so that it assumes an oval shape as shown in FIG. 6. Once the capacitor segment of the embodiment of FIGS. 3 and 7 has been wound, electrical leads may be connected to the unit. Either radial or axial leads may be applied to it. For example, radial leads 70, 72 ends may be soldered, or connected by other means to edges 32, 34, 36, 38 and 33, 35, 37, 39 of the wound film capacitor segment 61, as shown in FIG. 7.

What is claimed is:

1. An electrical capacitor segment comprising a dielectric layer, a first metallized electrode layer applied to one side of said dielectric layer, a second metallized electrode layer applied to the other side of said dielectric layer, with said dielectric layer being pleated so that a first plurality of pleat edges are formed along a first side of said capacitor segment and a second plurality of pleat edges are formed along a second side of said capacitor segment and so that each pleat edge forms a smooth generally circular bend and with the center of each bend being displaced at least four times the thickness of said dielectric layer from the centers of its adjacent neighboring bends along the same side of said capacitor segment, and so that said centers of said adjacent neighboring bends along said first side of said capacitor segment are progressively spaced inwardly toward the center of said capacitor segment, when viewed from the top to the bottom of said capacitor segment, while said centers of said adjacent neighboring bends along said second side of said capacitor segment are progressively spaced outwardly from the center of said capacitor segment, when viewed from the top to the bottom of said capacitor segment.

2. An electrical capacitor segment as claimed in claim 1, wherein a lead is secured to said pleat edges of said electrode layers.

3. An electrical capacitor segment as claimed in claim 1, wherein said dielectric layer is an elongated layer and said capacitor segment is wound along the elongated dimension of said layer subsequent to said pleating along longitudinal pleat lines.

4. An electrical capacitor segment as claimed in claim 3, wherein a lead is secured to said pleat edges of said electrode layers.

5. An electrical capacitor segment as claimed in claim 3, wherein said dielectric layer is an elongated layer and said capacitor segment is pleated along lines transverse to the elongated dimension of said layer subsequent to said pleating along longitudinal pleat lines.

6. An electrical capacitor segment as claimed in claim 5, wherein a lead is secured to said pleat edges of said electrode layers.

7. An electrical capacitor segment as claimed in claim 1, wherein said circular bend has a radius at least equal to the thickness of said dielectric layer.

8. An electrical capacitor segment as claimed in claim 7, wherein a lead is secured to said pleat edges of said electrode layers.

9. An electrical capacitor segment as claimed in claim 7, wherein said dielectric layer is an elongated layer and said capacitor segment is wound along the elongated dimension of said layer subsequent to said pleating along longitudinal pleat lines.

10. An electrical capacitor segment as claimed in claim 9, wherein a lead is secured to said pleat edges of said electrode layers.

* * * * *